(12) United States Patent
Saito (10) Patent No.: US 9,010,469 B2
(45) Date of Patent: Apr. 21, 2015

(54) GENERATION CONTROL DEVICE

(75) Inventor: Jun Saito, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 348 days.

(21) Appl. No.: 13/220,170

(22) Filed: Aug. 29, 2011

(65) Prior Publication Data

US 2012/0049806 A1 Mar. 1, 2012

(30) Foreign Application Priority Data

Aug. 30, 2010 (JP) ................. 2010-191778
Aug. 30, 2010 (JP) ................. 2010-191779

(51) Int. Cl.

| B60W 10/26 | (2006.01) |
| B60W 20/00 | (2006.01) |
| B60L 11/12 | (2006.01) |
| B60K 6/485 | (2007.10) |
| B60L 11/18 | (2006.01) |
| B60W 10/08 | (2006.01) |
| B60W 30/18 | (2012.01) |
| B60W 30/188 | (2012.01) |
| F16H 59/68 | (2006.01) |

(52) U.S. Cl.
CPC ............. *B60L 11/12* (2013.01); *B60K 6/485* (2013.01); *B60L 11/1861* (2013.01); *B60L 2240/30* (2013.01); *B60W 10/08* (2013.01); *B60W 10/26* (2013.01); *B60W 20/00* (2013.01); *B60W 30/18054* (2013.01); *B60W 30/1882* (2013.01); *B60W 2510/101* (2013.01); *F16H 2059/6823* (2013.01); *Y02T 10/6226* (2013.01); *Y02T 10/7005* (2013.01); *Y02T 10/7044* (2013.01); *Y02T 10/705* (2013.01); *Y02T 10/7077* (2013.01)

(58) Field of Classification Search
USPC ............. 180/65.1, 65.285, 65.29, 65.275, 180/65.265; 701/22; 322/23
See application file for complete search history.

(56) References Cited

U.S. PATENT DOCUMENTS

| 4,305,254 A * | 12/1981 | Kawakatsu et al. ............. 60/716 |
| 4,306,156 A * | 12/1981 | Monaco et al. ................. 290/17 |
| 4,351,405 A * | 9/1982 | Fields et al. ............ 180/65.225 |
| 6,205,379 B1 * | 3/2001 | Morisawa et al. .............. 701/22 |
| 6,629,024 B2 * | 9/2003 | Tabata et al. ................... 701/22 |
| 7,023,150 B2 * | 4/2006 | Hisada et al. .................. 318/34 |

(Continued)

FOREIGN PATENT DOCUMENTS

JP 2010-115075 A 5/2010

*Primary Examiner* — J. Allen Shriver, II
*Assistant Examiner* — Emma K Frick
(74) *Attorney, Agent, or Firm* — Birch, Stewart, Kolasch & Birch, LLP (57) ABSTRACT

A generation control device for a hybrid vehicle in which an electrical generator is driven by an engine, and a battery is charged by operation of the electrical generator and the engine, includes: a shift position detection unit that detects a shift position; a brake detection unit that detects whether a brake is on or off; a charging start unit; an increasing/decreasing unit that conducts increasing operation or decreasing operation; and a control unit that starts to charge the battery when the shift position is a non-travel position, the brake is on, and the charging start unit is operated. The control unit that, after starting to charge the battery, increases a parameter related to the electrical generation when the increasing operation is conducted, or the decreases the parameter when the decreasing operation is conducted. The control unit controls the engine and the power generator based on the set parameter.

12 Claims, 9 Drawing Sheets (56) References Cited

U.S. PATENT DOCUMENTS 7,434,641 B2 * 10/2008 Takami et al. .............. 180/65.25
7,440,827 B2 * 10/2008 Kawada et al. ................. 701/22
8,177,004 B2 * 5/2012 Shibata et al. ........... 180/65.235
8,197,383 B2 * 6/2012 Surnilla ............................ 477/3
8,224,513 B2 * 7/2012 Soliman et al. ................. 701/22

* cited by examiner

GENERATION CONTROL DEVICE

BACKGROUND OF THE INVENTION

1. Field of the Invention

The present invention relates to a generation control device for a hybrid vehicle.

2. Description of the Related Art

In a hybrid vehicle having an engine and a motor as power sources, there is an EV mode in which only the motor operates (the engine stops) to drive the vehicle, during which the motor uses an electricity charged in a battery. In the hybrid vehicle of this type, an electricity is generated by the engine and a generator, and the battery is charged with the generated electricity through an inverter (refer to JP-A-2010-115075).

In a normal hybrid vehicle, in a situation requiring a large output from the battery, such as travel in the EV mode, whether the large output is enabled, or not, depends on an SOC (state of charge) of the battery. When the SOC is low, the large output cannot be executed. Accordingly, in the situation requiring the large output from the battery such as travel in the EV mode, it is desirable that desired electrical power can be set to charge the battery to a predetermined SOC.

On the other hand, in a vehicle called "a plug-in hybrid vehicle", the battery can be charged from an external of the vehicle, and can be charged by home electrical power. Also, quick charge is enabled in a facility having a quick charger. However, the desired electrical power cannot be set for the home electrical power. Moreover, because the battery cannot be charged more than several kW by the home electrical power, it takes long time to charge the battery. Also, under the environment where none of the home electrical power and the quick charger are available, the plug-in hybrid vehicle is the same as the normal hybrid vehicle, and even under such environment, it is desirable that desired electrical power can be set to charge the battery to a predetermined SOC.

SUMMARY OF THE INVENTION

According to the invention, there is provided a generation control device for a hybrid vehicle in which an electrical generator is driven by an engine, and a battery is charged by electrical generation performed by the electrical generator and the engine, the generation control device comprising: a shift position detection unit that detects a shift position; a brake detection unit that detects whether a brake of is on or off; a charging start unit; an increasing/decreasing unit that conducts increasing operation or decreasing operation; and a control unit that starts to charge the battery when the shift position is a non-travel position, the brake is on, and the charging start unit is operated, the control unit that, after starting to charge the battery, conducts setting for increasing parameter related to the electrical generation when the increasing/decreasing unit conducts the increasing operation, or conducts setting for decreasing the parameter related to the electrical generation when the increasing/decreasing unit conducts the decreasing operation, to set the parameter, the control unit that controls the engine and the electrical generator so as to perform the electrical generation based on the set parameter.

DETAILED DESCRIPTION OF THE INVENTION

Hereinafter, a generation control device for a hybrid vehicle according to first and second embodiments of the present invention will be described with reference to FIGS. 1 to 9.

Figure 1:
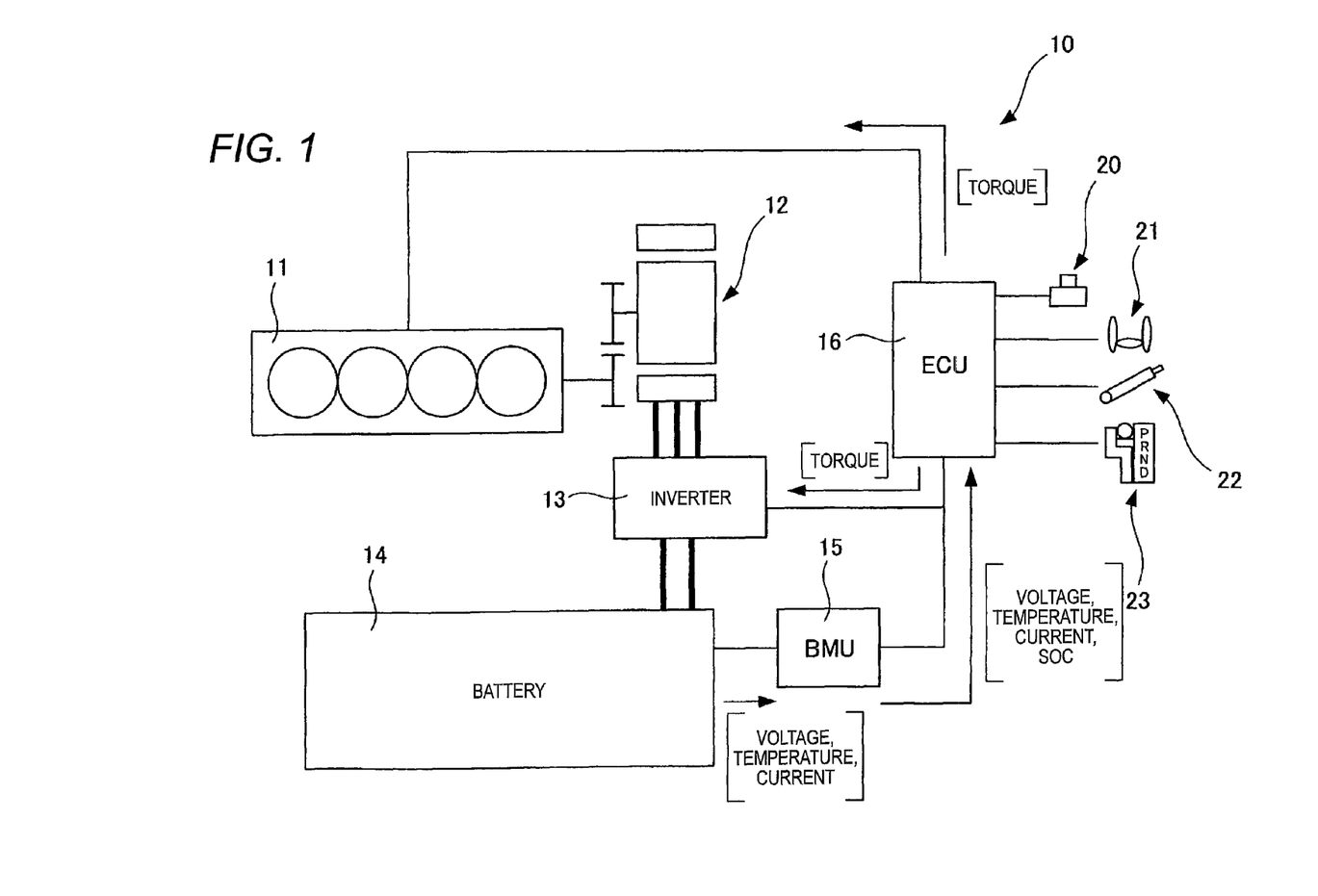
FIG. 1 is a schematic diagram illustrating an example of a generation control device for a hybrid vehicle according to the present invention.

In a generation control device for a hybrid vehicle according to the first and second embodiments, a vehicle 10 is a hybrid vehicle having an engine 11 and a motor (motor generator 12) as power sources as illustrated in FIG. 1. Specifically, the vehicle 10 includes the engine 11 that drives the vehicle and functions as a power source of electrical generation, an electrical generator (motor generator 12) that generates electrical power with the engine 11 as the power source, a battery 14 that is charged with electricity generated by the motor generator 12 through an inverter 13 that conducts DC-AC conversion, and the motor generator 12 that receives electricity from the battery 14 through the inverter 13 to drive the vehicle.

The first and second embodiments exemplify the motor generator 12 that functions as the motor and the electrical generator, but the present invention is also applicable to a configuration having a motor and an electrical generator, independently. Also, the hybrid vehicle may be a plug-in hybrid vehicle that can charge the battery 14 by a home electrical power or a quick charger outside the vehicle 10.

The engine 11, the motor generator 12, the inverter 13, and the battery 14 are connected to an ECU (electronics control unit) 16 through a communication line (for example, CAN (controller area network; control unit). The ECU 16 detects states of the engine 11, the motor generator 12, the inverter 13, and the battery 14 through the communication line, and controls the engine 11, the motor generator 12, the inverter 13, and the battery 14 on the basis of the detected states. The battery 14 is connected to the ECU 16 through a BMU (battery management unit) 15 that manages the battery 14. The BMU 15 monitors voltage, temperature, and current of the battery 14, calculates the SOC (charging rate calculation unit), and notifies the ECU 16 of the voltage, temperature and current as well as the calculated SOC.

The ECU 16 also detects the operation states of various operation devices. In the first and second embodiments, the ECU 16 includes a charge switch 20 (charging start unit) that forcedly drives the engine 11, and starts to charge the battery 14 with the electricity generated by the motor generator 12. The ECU 16 also includes a paddle shift 21 (increasing/ decreasing unit) that conducts shift-up and shift-down operation, a parking brake 22 (brake detection unit) that can detect whether a brake is on or off, and a shift unit 23 (shift position detection unit) that detects whether a shift position is travel position or non-travel position. The ECU 16 detects those operation states to conduct generation control that will be described later. When the paddle shift 21 is made to operate under a predetermined condition, the ECU 16 may allow the paddle shift 21 to forcedly drive the engine 11. That is, the charge switch 20 and the paddle shift 21 may be used together as one element.

The first and second embodiments employ the paddle shift 21 as an example. However, another unit may be available if the unit can increase or decrease setting for the vehicle 10 step-by-step. For example, the operation switch of a cruise control can be used. The parking brake (hand brake) is employed in the first and second embodiments, however, a brake pedal may be employed instead of it.

First Embodiment

Figure 2:
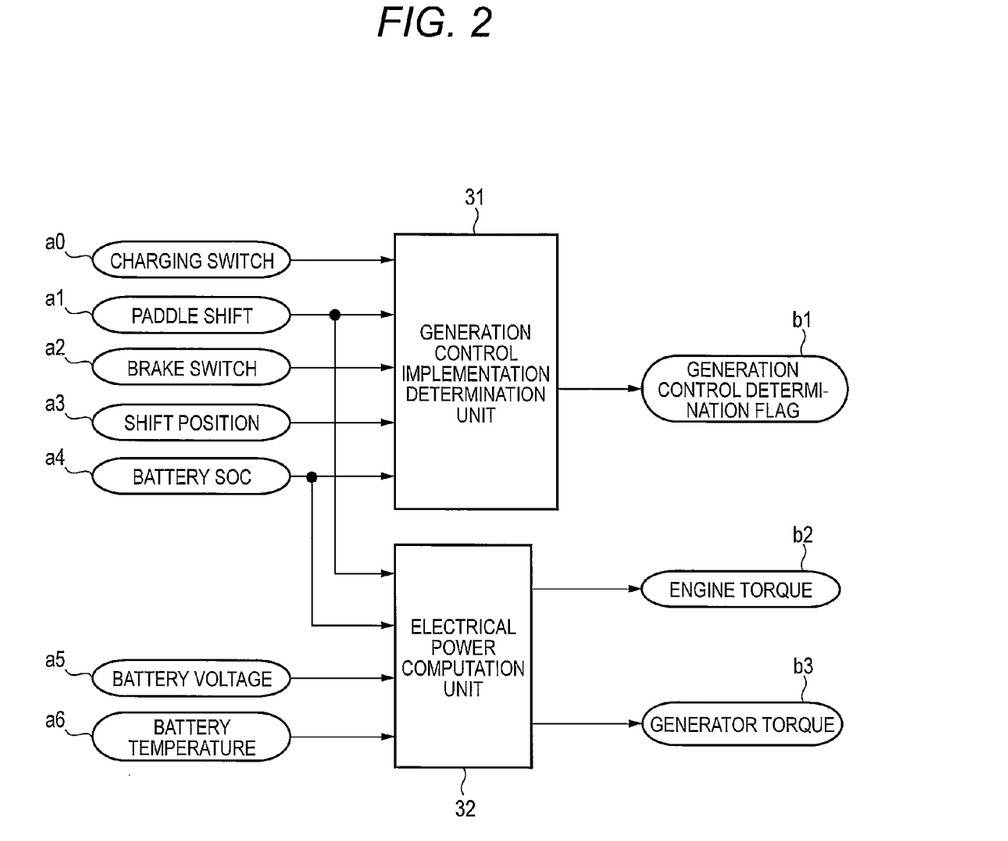
FIG. 2 is a block diagram of a first embodiment of the generation control device illustrated in FIG. 1.

Now, the control in the first embodiment of the invention will be roughly described with reference to FIG. 2 illustrating a control block in the ECU 16.

The ECU 16 includes a generation control implementation determination unit 31 that determines whether generation control is implemented or not, and an electrical power computation unit 32 that computes electrical power in the generation control.

The generation control implementation determination unit 31 receives an operation signal a0 from the charge switch 20, a paddle shift signal a1 from the paddle shift 21, a brake switch signal a2 from the parking brake 22, a shift position signal a3 from the shift unit 23, and a battery SOC value a4 from the BMU 15 (refer to FIGS. 1 and 2). Then, the generation control implementation determination unit 31 determines whether the generation control is implemented or not, on the basis of the input values (input signals), and outputs a generation control determination flag b1. The determination for implantation of the generation control will be described with reference to a flowchart of FIG. 3 which will be described later.

Also, the electrical power computation unit 32 receives the paddle shift signal a1 from the paddle shift 21, the battery SOC value a4 from the BMU 15, a battery voltage a5, and a battery temperature a6 (refer to FIGS. 1 and 2). The electrical power computation unit 32 computes desired electrical power on the basis of the input values (input signals), and outputs, on the basis of the computed electrical power, an engine torque b2 to the engine 11, and a generator torque b3 to the inverter 13. The computation of the electrical power will be described with reference to a flowchart of FIG. 4 which will be described later.

Figure 3:
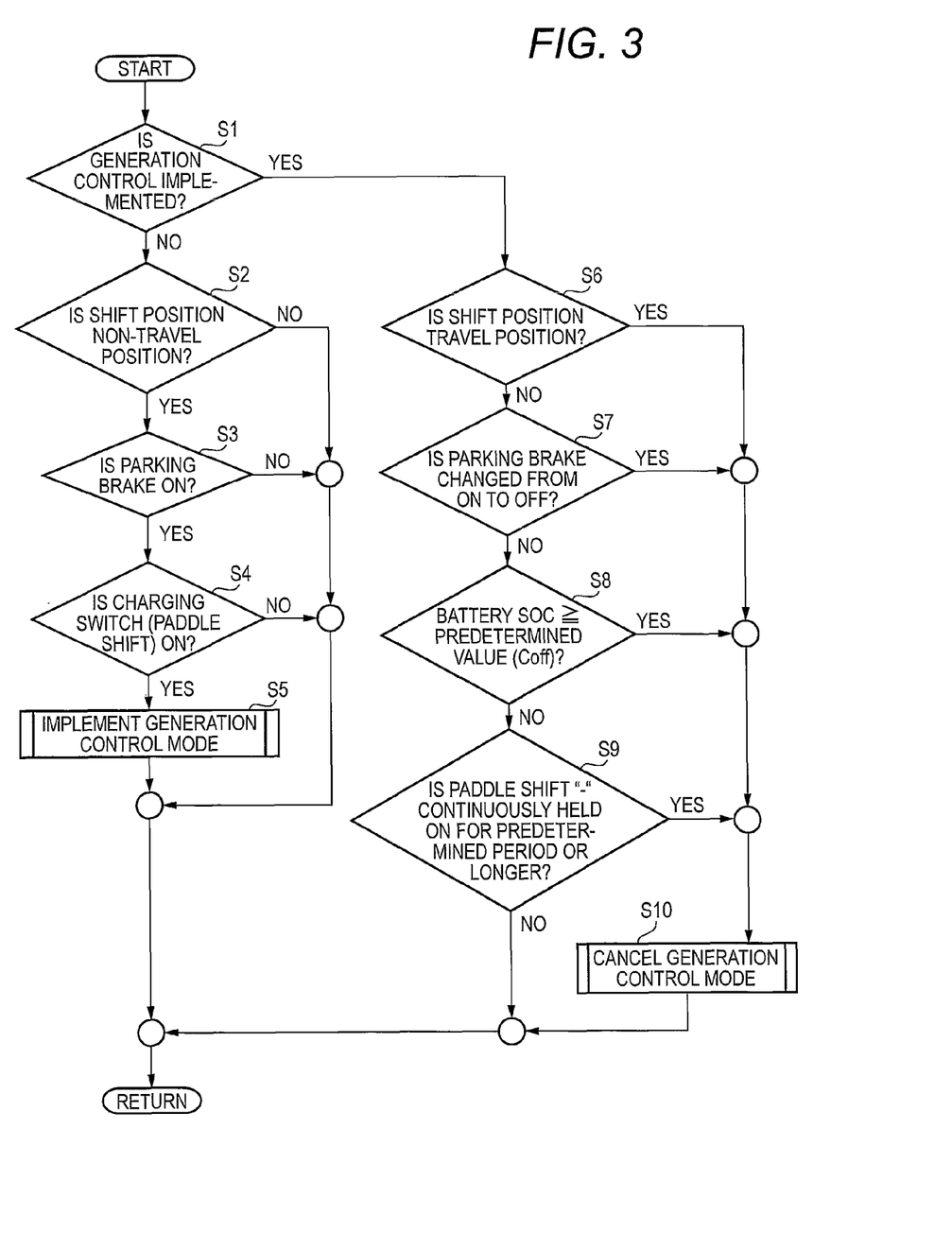
FIG. 3 is a flowchart illustrating control in the first embodiment of the generation control device illustrated in FIG. 1.

First, a description will be given of the determination for implementation of the generation control in the first embodiment of the generation control device for the hybrid vehicle illustrated in FIGS. 1 and 2 with reference to a flowchart illustrated in FIG. 3.

(Step S1)
In the ECU 16, it is confirmed whether the generation control is implemented or not. If not implemented, the processing is advanced to Step S2. If implemented, the processing is advanced to Step S6. In the following description, Steps S2 to S4 are a procedure for confirming the conditions for implementing the generation control, and Steps S6 to S9 are a procedure for confirming the conditions for canceling the generation control.

(Step S2)
If the generation control is not implemented, it is confirmed whether the shift position signal a3 from the shift unit 23 is indicative of a non-travel position or not. If it is the non-travel position, the processing is advanced to Step S3. If it is not the non-travel position, a series of controls are completed. The non-travel position corresponds to "P" (parking position) and "N" (neutral position).

(Step S3)
If the shift unit 23 is at the non-travel position, it is also confirmed whether the brake switch signal a2 from the parking brake 22 is "on" or not. If it is "on", that is, a brake is activated, the processing is advanced to Step S4, and if it is not "on", the series of controls are completed.

In the case where the parking brake 22' is used as a unit for detecting the brake operation, after the generation control mode turns "on", a driver can leave the vehicle. On the other hand, in the case where the brake pedal is used as the unit for detecting the brake operation, after the generation control mode turns "on", the brake switch signal needs to be "on", that is, the brake pedal needs to be pressed when the conditions for starting the generation control are determined, taking that the driver leaves the vehicle into consideration. In this situation, when the conditions for canceling the generation control are determined, one of the conditions includes that the brake pedal is again pressed as will be described later.

(Step S4)
If the parking brake 22 is "on", it is also confirmed whether the operation signal a0 from the charge switch 20 is "on" or not. If it is "on", the processing is advanced to Step S5. If it is not "on", the series of controls are completed.

In the case where the charge switch 20 and the paddle shift 21 are used together as one element, even if a "+" lever or a "−" lever of the paddle shift 21 turns "on", the ECU 16 determines that the paddle shift signal a1 turns "on". If the paddle shift signal a1 is "on", the processing is advanced to Step S5. If it is not "on", the series of controls are completed. In this situation, since the shift unit 23 is at the non-travel position, and the parking brake 22 is "on", a normal function of the paddle shift 21, that is, a function of changing the shift position suspends. Instead of the function, the operation of the paddle shift 21 is one of the conditions for starting the generation control mode.

(Step S5)
If all of the conditions in Steps S2 to S4 are satisfied, that is, if the shift unit 23 is at the non-travel position, the parking brake 22 is "on", and the charge switch 20 (paddle shift 21) turns "on", it is determined that the generation control can be implemented, and the generation control mode turns "on". Then, the generation control determination flag b1 is output from the ECU 16 (generation control implementation determination unit 31), and the generation control is implemented. In other words, if any one of the conditions in Steps S2 to S4 is not satisfied, the generation control cannot be implemented, and the generation control mode does not turn "on".

(Step S6)
On the other hand, when the generation control is implemented, it is confirmed whether the shift position signal a3 from the shift unit 23 is indicative of the travel position. If it is not the travel position, the processing is advanced to Step S7, and if it is the travel position, the processing is advanced to Step S10, the generation control mode is canceled, and the series of control is completed.

(Step S7)
If the shift unit 23 is not at the travel position, it is confirmed whether the brake switch signal a2 from the parking brake 22 is changed from "on" to "off" or not. If not changed, the processing is advanced to Step S8, and if changed, the processing is advanced to Step S10, the generation control mode is canceled, and the series of controls are completed.

In the case where the brake pedal is used as the unit for detecting the brake operation, the condition that the brake pedal is again pressed is one of the conditions for canceling the generation control. It is confirmed whether the brake switch signal from the brake pedal is changed from "off" to "on" or not. If not changed, the processing is advanced to Step S8, and if changed, the processing is advanced to Step S10, the generation control mode is canceled, and the series of controls are completed.

(Step S8)

If the parking brake 22 is not changed from "on" to "off", it is also confirmed whether the battery SOC value a4 input from the BMU 15 is a predetermined value ($C_{off}$) or more, or not. If it is not the predetermined value or more, the processing is advanced to Step S9. If it is the predetermined value or more, the processing is advanced to Step S10, the generation control mode is canceled, and the series of controls are completed. That is, if the battery SOC value a4 is the predetermined value ($C_{off}$) or more, the generation control mode is automatically canceled. The predetermined value ($C_{off}$) may be set to, for example, a numerical value of a charging rate 60% or more at which the travel in the EV mode is enabled.

(Step S9)

If the battery SOC value a4 is not the predetermined value or more, it is also confirmed whether the "−" lever of the paddle shift 21 is continuously held "on" for a predetermined period or longer, or not. If it is not continuously held "on" for the predetermined period or longer, the series of controls are completed as it is. If it is continuously held "on" for the predetermined period or longer, the processing is advanced to Step S10, the generation control mode is canceled, and the series of controls are completed. That is, when the driver wishes to cancel the generation control mode, the driver may press and hold the "−" lever of the paddle shift 21.

(Step S10)

If any one of the conditions in Steps S6 to S9 is satisfied, that is, if the shift unit 23 is at the travel position, if the parking brake 22 is changed from "on" to "off", if the battery SOC value a4 is the predetermined value or more, or if the "−" lever of the paddle shift 21 is continuously held "on" for the predetermined period or longer, it is determined that the generation control cannot be implemented, and the generation control mode is canceled. In other words, if none of the conditions in Steps S6 to S9 are satisfied, the generation control can be implemented, and an "on" state of the generation control mode is maintained.

Figure 4:
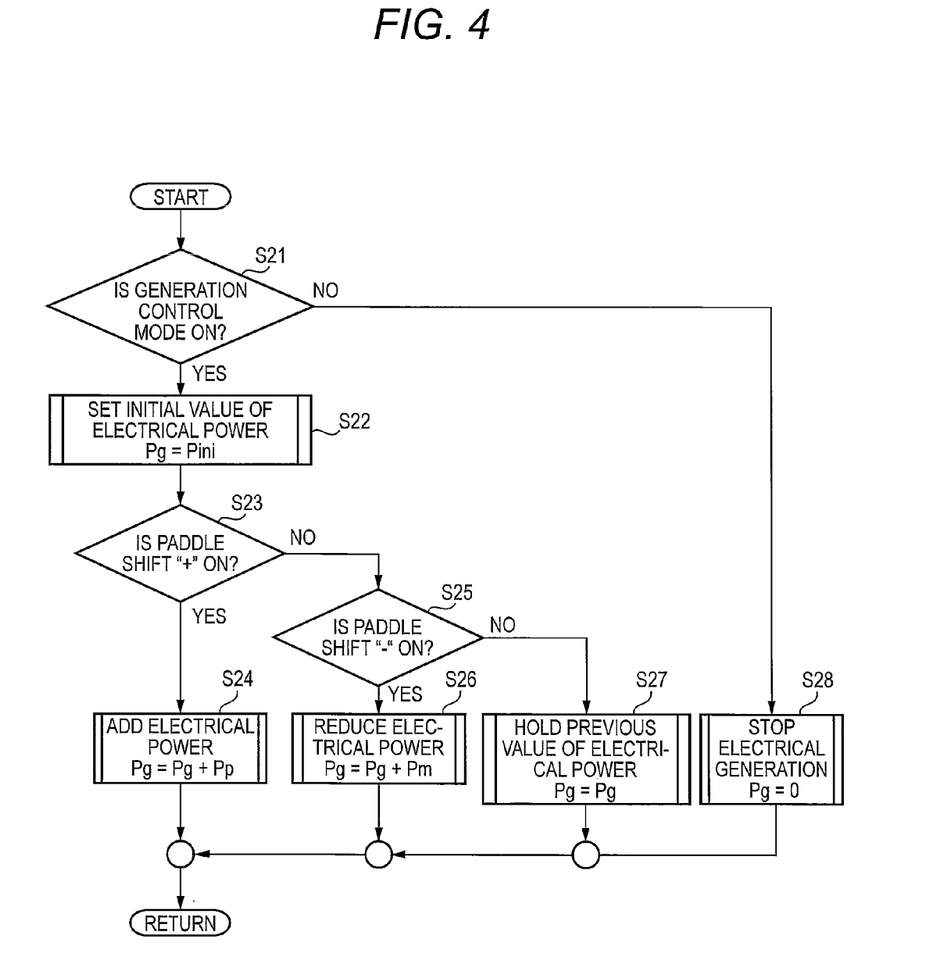
FIG. 4 is a flowchart illustrating setting of electrical power in a generation control mode under the control illustrated in FIG. 3.

Subsequently, a description will be given of the computation of the electrical power in the first embodiment of the generation control device for the hybrid vehicle illustrated in FIGS. 1 and 2 with reference to the flowchart illustrated in FIG. 4, and a mapping diagram illustrated in FIG. 5.

(Step S21)

In the ECU 16, it is confirmed whether the generation control mode is "on" or not. If it is "on", the processing is advanced to Step S22, and if it is not "on", the processing is advanced to Step S28. In the following control, when the generation control mode is "on", the normal function of the paddle shift 21, that is, the function of changing the shift position suspends, and the paddle shift 21 is used as a function of increasing or decreasing the electrical power instead.

(Step S22)

If the generation control mode is "on", "Pini" is set as an initial value of electrical power (Pg=Pini), and the processing is advanced to Step S23. The initial value Pini may be set to, for example, "30 kW" which is a center value of the mapping diagram of FIG. 5 which will be described later, taking addition or subtraction in this control into consideration.

(Step S23)

It is confirmed whether the "+" lever of the paddle shift 21 turns "on" or not. If it is "on", the processing is advanced to Step S24. If it is not "on", the processing is advanced to Step S25.

(Step S24)

If the "+" level of the paddle shift 21 turns "on", that is, if the increasing operation is conducted, the electrical power is added, and an increase of the electrical power, that is, (Pg=Pg+Pp) is set. For example, when the "+" lever of the paddle shift 21 first turns "on" after the generation control mode turns "on", that is, if it is the first time, "Pg" is "Pini+Pp" (Pg=Pini+Pp). If the "+" lever of the paddle shift 21 successively turns "on", that is, if it is the second time, "Pg" is "Pini+Pp+Pp" (Pg=Pp+Pp+Pp). The additional value "Pp" is a positive value, and may be set to, for example, "+10 kW" in the mapping diagram of FIG. 5 which will be described later.

(Step S25)

If the "+" lever of the paddle shift 21 does not turn "on", it is confirmed whether the "−" lever turns "on" or not. If it is "on", the processing is advanced to Step S26, but if it is not "on", the processing is advanced to Step S27.

(Step S26)

If the "−" lever of the paddle shift 21 turns "on", that is, if the decrease operation is conducted, the electrical power is reduced, and a decrease of the electrical power, that is, (Pg=Pg+Pm) is set. For example, when the "−" lever of the paddle shift 21 first turns "on" after the generation control mode turns "on", that is, if it is the first time, "Pg" is "Pini+Pm" (Pg=Pini+Pm). If the "−" lever of the paddle shift 21 successively turns "on", that is, if it is the second time, "Pg" is "Pini+Pm+Pm" (Pg=Pini+Pm+Pm). The subtraction value "Pm" is a negative value, and may be set to, for example, "−10 kW" in the mapping diagram of FIG. 5 which will be described later.

(Step S27)

If the "+" lever of the paddle shift 21 does not turn "on" and the "−" lever does not also turn "on", a previous value used during previous charging operation is held as the electrical power, and (Pg=Pg (previous value)) is set.

(Step S28)

On the other hand, if the generation control mode is not "on", it is an electrical generation stop state, and (Pg=0) is set.

Through the above procedure, in the state where the generation control mode is "on", the use of the "+" lever and "−" lever of the paddle shift 21 enables the driver to set increase or decrease of the electrical power. As a result, if the setting is conducted once, the generation control mode is automatically completed without requiring the driver's operation if the battery SOC value a4 arrives at the predetermined value (Coff) or more, unless a change in the setting or a stop of charging operation is required.

Also, the driver can set the electrical power according to the ambient surrounding. For example, if the decrease in the electrical power is set under quiet environments such as a residential area, the charging operation can be conducted in a state where noise from the engine 11 is reduced. Also, when the quick charging operation is required under the circumstances where there is no worry about noise, if the increase in the electrical power is set, an output from the motor generator 12 is increased to enable the quick charging operation.

Figure 5:
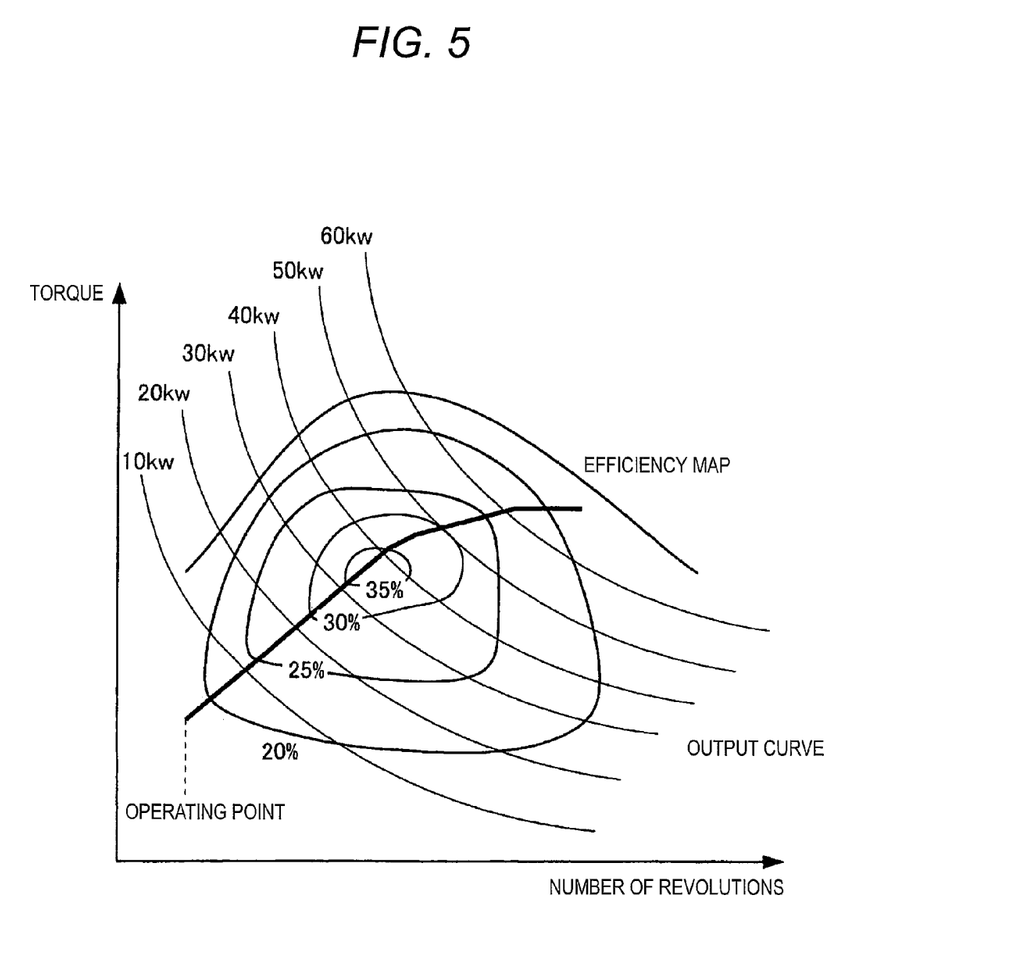
FIG. 5 is a mapping diagram illustrating an operating point of electrical power.

If the generation control mode is "on", a fuel-efficient operating point is calculated on the basis of the electrical power Pg set through the above procedure with reference to the mapping diagram illustrated in FIG. 5. The electrical generation is performed while the engine 11, the motor generator 12, and the inverter 13 are controlled under the condition of the calculated operating point. Thereafter, as described in FIG. 3, the generation control mode is automatically canceled when the SOC reaches the predetermined value, and the charging operation is completed. The operating point thus calculated is the most fuel-efficient operating condition in the same electrical power. FIG. 5 is the mapping diagram in which the fuel-efficient map of the engine 11 and an output curve of the electrical power in the electrical generator (motor generator 12) overlap with each other with respect to the number of revolutions and torque of the engine 11.

For example, in the mapping diagram illustrated in FIG. 5, if the electrical power "Pg" is "10 kW" (Pg=10), the highest fuel efficiency is about 20%, and the electrical generation is performed with the number of revolutions and the torque at the operating point of this condition, that is, the operating point on a heavy line. Also, if the electrical power "Pg" is "40 kW" (Pg=40 kW), the highest fuel efficiency is about 35%, and the electrical generation is performed with the number of revolutions and the torque at the operating point of this condition, that is, the operating point on the heavy line.

In the mapping diagram illustrated in FIG. 5, the highest fuel efficiency is 35%, and the largest electrical power under this condition is 40 kW. Accordingly, in the flowchart illustrated in FIG. 4, when the "+" lever of the paddle shift 21 is pressed a predetermined number of times or more, or continuously pressed and held for a predetermined period or longer, the operating point of the electrical power 40 kW and the fuel efficiency 35% may be automatically set for the electrical generation.

When the travel in the EV mode needs to be conducted as quickly as possible under this control, even under the circumstances where no quick charger is provided, the electrical power is generated by the aid of the engine 11 whereby the battery 14 can be charged with electric power of several dozen kW. As a result, the battery can be charged up to the predetermined SOC in a short period as compared with charging from the home electrical power that charges the battery with electric power of several kW.

Second Embodiment

Figure 6:
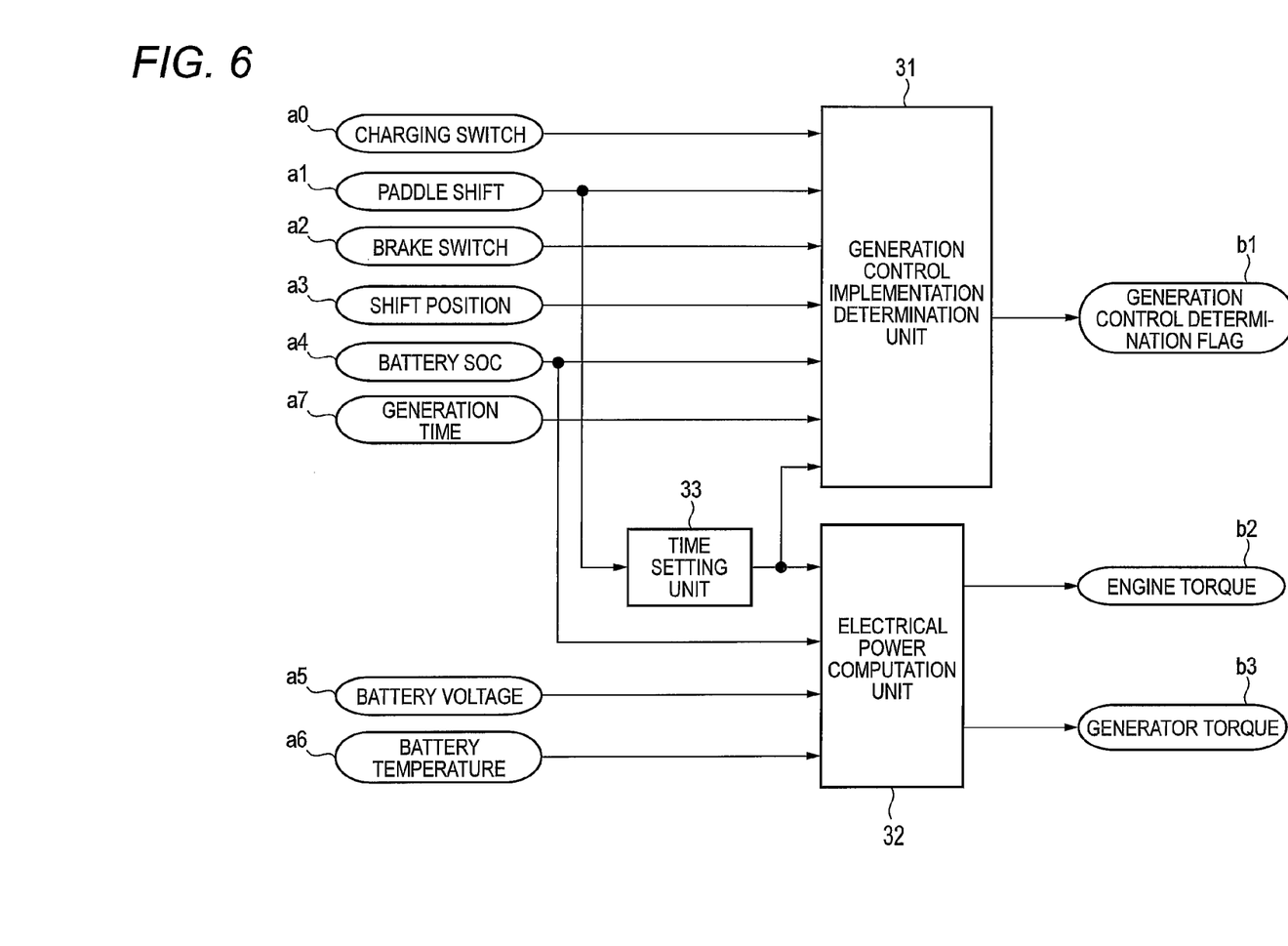
FIG. 6 is a block diagram of a second embodiment of the generation control device illustrated in FIG. 1.

Next, the control in the second embodiment of the invention will be roughly described with reference to FIG. 6 illustrating a control block in the ECU 16.

The ECU 16 includes a power generation control implementation determination unit 31 that determines whether generation control is implemented or not, an electrical power computation unit 32 that computes electrical power in the generation control, and a time setting unit 33 that sets generation time for the electrical generation.

The generation control implementation determination unit 31 receives an operation signal a0 from the charge switch 20, a paddle shift signal a1 from the paddle shift 21, a brake switch signal a2 from the parking brake 22, a shift position signal a3 from the shift unit 23, and a battery SOC value a4 from the BMU 15 (refer to FIGS. 1 and 6). Also, the power generation control implementation determination unit 31 receives a previous value a7 of the generation time, and also a present value of the generation time set in the time setting unit 33. Then, the generation control implementation determination unit 31 determines whether the generation control is implemented or not, on the basis of the input values (input signals), and outputs a generation control determination flag b1. The determination for implantation of the generation control will be described with reference to a flowchart of FIG. 7 which will be described later.

Also, the electrical power computation unit 32 receives the present generation time set in the time setting unit 33, the battery SOC value a4 from the BMU 15, a battery voltage a5, and a battery temperature a6 (refer to FIGS. 1 and 6). The electrical power computation unit 32 computes desired electrical power on the basis of the input values (input signals), and outputs, on the basis of the computed electrical power, an engine torque b2 to the engine 11, and a generator torque b3 to the inverter 13. The computation of the electrical power will be described with reference to a flowchart of FIG. 9 which will be described later.

Also, the time setting unit 33 receives the paddle shift signal a1 from the paddle shift 21, and the present generation time is set on the basis of this input signal. The setting of the generation time will be described with reference to a flowchart of FIG. 8 which will be described later.

Figure 7:
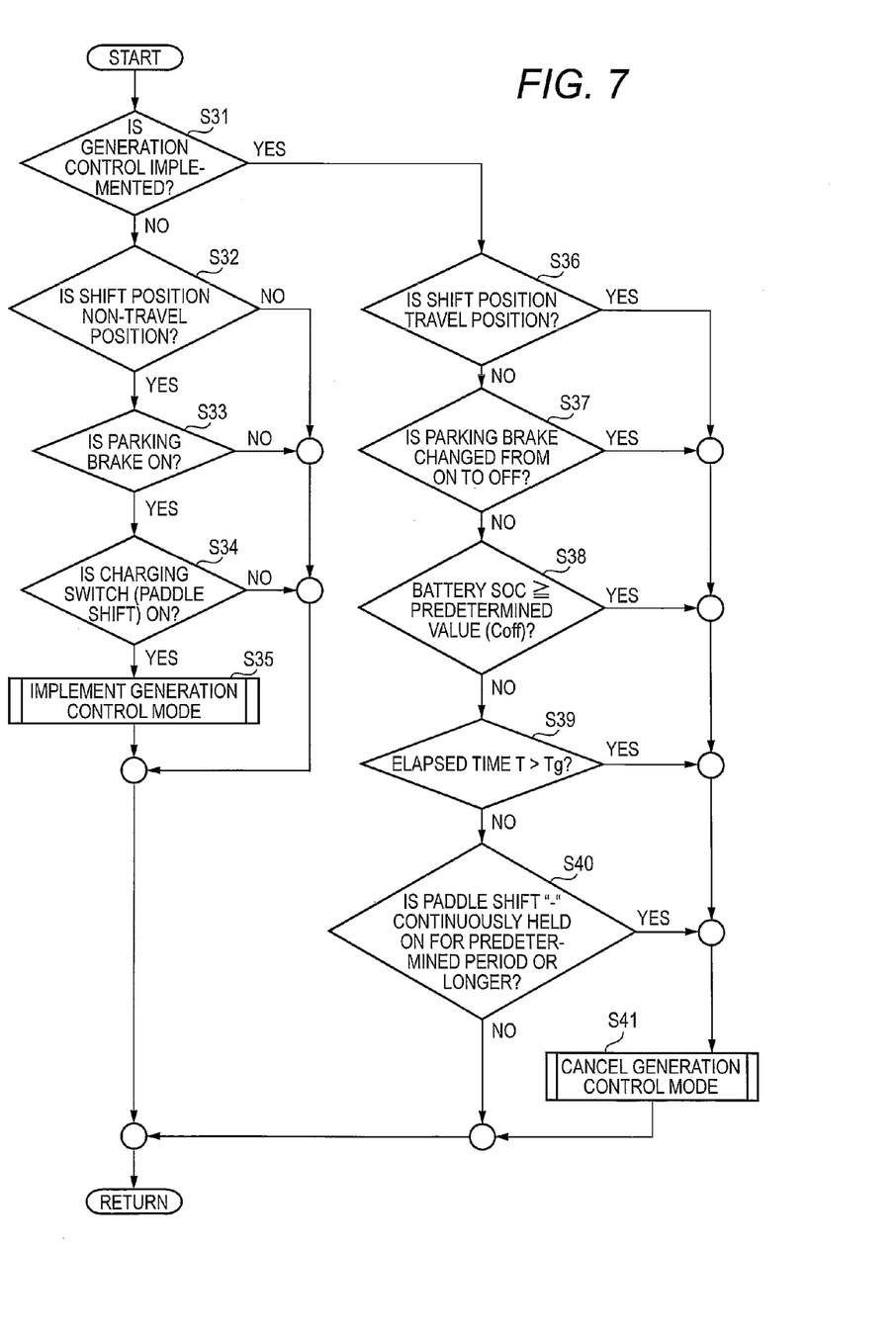
FIG. 7 is a flowchart illustrating control in the second embodiment of the generation control device illustrated in FIG. 1.

First, a description will be given of the determination for implementation of the generation control in the second embodiment of the generation control device for the hybrid vehicle illustrated in FIGS. 1 and 6 with reference to a flowchart illustrated in FIG. 7.

(Step S31)

In the ECU 16, it is confirmed whether the generation control is implemented or not. If not implemented, the processing is advanced to Step S32. If implemented, the processing is advanced to Step S36. In the following description, Steps S32 to S34 are a procedure for confirming the conditions for implementing the generation control, and Steps S36 to S39 are a procedure for confirming the conditions for canceling the generation control.

(Step S32)

If the generation control is not implemented, it is confirmed whether the shift position signal a3 from the shift unit 23 is indicative of a non-travel position or not. If it is the non-travel position, the processing is advanced to Step S33. If it is not the non-travel position, a series of controls are completed. The non-travel position corresponds to "P" (parking position) and "N" (neutral position).

(Step S33)

If the shift unit 23 is at the non-travel position, it is also confirmed whether the brake switch signal a2 from the parking brake 22 is "on" or not. If it is "on", that is, a brake is activated, the processing is advanced to Step S34, and if it is not "on", the series of controls are completed.

In the case where the parking brake 22 is used as a unit for detecting the brake operation, after the generation control mode turns "on", a driver can leave the vehicle. On the other hand, in the case where the brake pedal is used as the unit for detecting the brake operation, after the generation control mode turns "on", the brake switch signal needs to be "on", that is, the brake pedal needs to be pressed when the conditions for starting the generation control are determined, taking that the driver leaves the vehicle into consideration. In this situation, when the conditions for canceling the generation control are determined, one of the conditions includes that the brake pedal is again pressed as will be described later.

(Step S34)

If the parking brake 22 is "on", it is also confirmed whether the operation signal a0 from the charge switch 20 is "on" or not. If it is "on", the processing is advanced to Step S35. If it is not "on", the series of controls are completed.

In the case where the charge switch 20 and the paddle shift 21 are used together as one element, even if a "+" lever or a "−" lever of the paddle shift 21 turns "on", the ECU 16 determines that the paddle shift signal a1 turns "on". If the paddle shift signal a1 is "on", the processing is advanced to Step S35. If it is not "on", the series of controls are completed. In this situation, since the shift unit 23 is at the non-travel position, and the parking brake 22 is "on", a normal function of the paddle shift 21, that is, a function of changing the shift position suspends. Instead of the function, the operation of the paddle shift 21 is one of the conditions for starting the generation control mode.

(Step S35)

If all of the conditions in Steps S32 to S34 are satisfied, that is, if the shift unit 23 is at the non-travel position, the parking brake 22 is "on", and the charge switch 20 (paddle shift 21) turns "on", it is determined that the generation control can be implemented, and the generation control mode turns "on". Then, the generation control determination flag b1 is output from the ECU 16 (generation control implementation determination unit 31), and the generation control is implemented. In other words, if any one of the conditions in Steps S32 to S34 is not satisfied, the generation control cannot be implemented, and the generation control mode does not turn "on".

(Step S36)

On the other hand, when the generation control is implemented, it is confirmed whether the shift position signal a3 from the shift unit 23 is indicative of the travel position. If it is not the travel position, the processing is advanced to Step S37, and if it is the travel position, the processing is advanced to Step S41, the generation control mode is canceled, and the series of control is completed.

(Step S37)

If the shift unit 23 is not at the travel position, it is confirmed whether the brake switch signal a2 from the parking brake 22 is changed from "on" to "off" or not. If not changed, the processing is advanced to Step S38, and if changed, the processing is advanced to Step S41, the generation control mode is canceled, and the series of controls are completed.

In the case where the brake pedal is used as the unit for detecting the brake operation, the condition that the brake pedal is again pressed is one of the conditions for canceling the generation control. It is confirmed whether the brake switch signal from the brake pedal is changed from "off" to "on" or not. If not changed, the processing is advanced to Step S38, and if changed, the processing is advanced to Step S41, the generation control mode is canceled, and the series of controls are completed.

(Step S38)

If the parking brake 22 is not changed from "on" to "off", it is also confirmed whether the battery SOC value a4 input from the BMU 15 is a predetermined value ($C_{off}$) or more, or not. If it is not the predetermined value or more, the processing is advanced to Step S39. If it is the predetermined value or more, the processing is advanced to Step S41, the generation control mode is canceled, and the series of controls are completed. That is, if the battery SOC value a4 is the predetermined value ($C_{off}$) or more, the generation control mode is automatically canceled. The predetermined value ($C_{off}$) may be set to, for example, a numerical value of a charging rate 60% or more at which the travel in the EV mode is enabled.

(Step S39)

When the battery SOC value a4 is not a predetermined value or more, it is confirmed whether elapsed time T after the generation control mode turns "on" exceeds present generation time Tg set in the time setting unit 33, or not. If the elapsed time T is equal to or smaller than the present generation time Tg (if T>Tg is not satisfied), the processing is advanced to Step S40. If the elapsed time T is greater than the present generation time Tg (if T>Tg is satisfied), the processing is advanced to Step S41, the generation control mode is canceled, and the series of controls are completed. That is, if the charging time exceeds the set generation time Tg, the generation control mode is automatically canceled.

(Step S40)

If the elapsed time T is equal to or smaller than the present generation time Tg (if T>Tg is not satisfied), it is also confirmed whether the "−" lever of the paddle shift 21 is continuously held "on" for a predetermined period or longer, or not. If it is not continuously held "on" for the predetermined period or longer, the series of controls are completed as it is. If it is continuously held "on" for the predetermined period or longer, the processing is advanced to Step S41, the generation control mode is canceled, and the series of controls are completed.

(Step S41)

If any one of the conditions in Steps S36 to S40 is satisfied, that is, if the shift unit 23 is at the travel position, if the parking brake 22 is changed from "on" to "off", if the battery SOC value a4 is the predetermined value or more, if the elapsed time T is greater than the present generation time Tg (if T>Tg is satisfied), or if the "−" lever of the paddle shift 21 is continuously held "on" for the predetermined period or longer, it is determined that the generation control cannot be implemented, and the generation control mode is canceled. In other words, if none of the conditions in Steps S36 to S40 are satisfied, the generation control can be implemented, and an "on" state of the generation control mode is maintained.

Subsequently, a description will be given of the computation of the generation time in the second embodiment of the generation control device for the hybrid vehicle illustrated in FIGS. 1 and 6 with reference to the flowchart illustrated in FIG. 8.

(Step S51)

In the ECU 16, it is confirmed whether the generation control mode is "on" or not. If it is "on", the processing is advanced to Step S52, and if it is not "on", the processing is advanced to Step S58. In the following control, when the generation control mode is "on", the normal function of the paddle shift 21, that is, the function of changing the shift position suspends, and the paddle shift 21 is used as a function of increasing or decreasing the generation time instead.

(Step S52)

If the generation control mode is "on", "Tini" is set as an initial value of generation time (Tg=Tini), and the processing is advanced to Step S53.

(Step S53)

It is confirmed whether the "+" lever of the paddle shift 21 turns "on" or not. If it is "on", the processing is advanced to Step S54. If it is not "on", the processing is advanced to Step S55.

(Step S54)

If the "+" level of the paddle shift 21 turns "on", that is, if the increasing operation is conducted, the generation time is added, and an increase of the generation time, that is, (Tg=Tg+Tp) is set. For example, when the "+" lever of the paddle shift 21 first turns "on" after the generation control mode turns "on", that is, if it is the first time, "Tg" is "Tini+Tp" (Tg=Tini+Tp). If the "+" lever of the paddle shift 21 successively turns "on", that is, if it is the second time, "Tg" is "Tini+Tp+Tp" (Tg=Tini+Tp+Tp). The additional value "Tp" is a positive value.

(Step S55)

If the "+" lever of the paddle shift 21 does not turn "on", it is confirmed whether the "−" lever turns "on" or not. If it is "on", the processing is advanced to Step S56, but if it is not "on", the processing is advanced to Step S57.

(Step S56)

If the "−" lever of the paddle shift 21 turns "on", that is, if the decrease operation is conducted, the generation time is reduced, and a decrease of the generation time, that is, (Tg=Tg+Tm) is set. For example, when the "−" lever of the paddle shift 21 first turns "on" after the generation control mode turns "on", that is, if it is the first time, "Tg" is "Tini+Tm" (Tg=Tini+Tm). If the "−" lever of the paddle shift 21 successively turns "on", that is, if it is the second time, "Tg" is "Tini+Tm+Tm" (Tg=Tini+Tm). The subtraction value "PTm" is a negative value.

(Step S57)

If the "+" lever of the paddle shift 21 does not turn "on" and the "−" lever does not also turn "on", a previous value used during previous charging operation is held as the generation time, and (Tg=Tg (previous value)) is set.

(Step S58)

On the other hand, if the generation control mode is not "on", it is an electrical generation stop state, and (Tg=0) is set.

Subsequently, a description will be given of the computation of the electrical power in the second embodiment of the generation control device for the hybrid vehicle illustrated in FIGS. 1 and 6 with reference to a flowchart illustrated in FIG. 9 and the mapping diagram illustrated in FIG. 5.

(Step S61)

In the ECU 16, it is confirmed whether the generation control mode is "on", or not, and if it is "on", the processing is advanced to Step S62, and if it is not "on", the processing is advanced to Step S66.

(Step S62)

If the generation control mode is "on", it is confirmed whether the "+" lever or the "−" lever of the paddle shift 21 turns "on", or not. If any one of the levers turns "on", the processing is advanced to Steps S63 and S64. On the other hand, if none of the levers turns "on", the processing is advanced to Step S65.

(Step S63)

If any one of the "+" lever and the "−" lever of the paddle shift 21 turns "on", new generation time Tg is set as described in FIG. 6. Accordingly, the maximum chargeable electrical power Pt (kW) per unit time is computed by the using the generation time Tg (h). More specifically, when it is assumed that the chargeable capacity of the battery 14 is Cc (kWh), the maximum chargeable electrical power Pt (kW) is obtained by [Maximum chargeable electrical power Pt=Chargeable capacity Cc/Generation time Tg].

(Step S64)

Then, the electrical power Pg is determined on the basis of the maximum chargeable electrical power Pt obtained in Step S63. More specifically, for the purpose of preventing the electrical power Pg from exceeding an acceptable electrical power Pb of the battery 14, if the maximum chargeable electrical power Pt is equal to or lower than the acceptable electrical power Pb, the obtained maximum chargeable electrical power Pt is set. If the maximum chargeable electrical power Pt exceeds the acceptable electrical power Pb, the acceptable electrical power Pb is set.

(Step S65)

Figure 8:
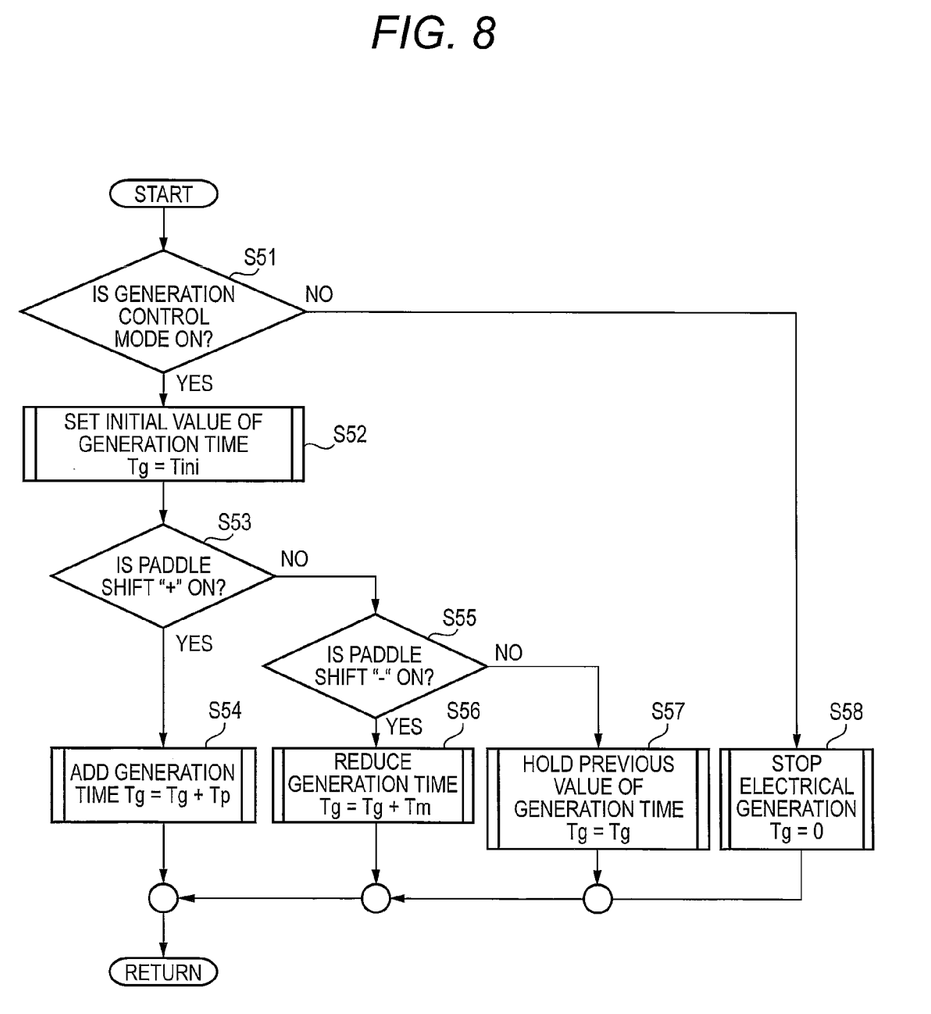
FIG. 8 is a flowchart illustrating setting of generation time in a generation control mode under the control illustrated in FIG. 7.

If neither of the "+" lever and the "−" lever of the paddle shift 21 turn "on", as described in FIG. 8, the previous generation time is set for the generation time Tg, and the previous electrical power Pg is set for the electrical power Pg.

On the other hand, if the generation control mode is not "on", the present state is an electrical generation stop state, and as illustrated in FIG. 8, the generation time Tg is 0 (Tg=0), and the electrical power Pg is also 0 (Pg=0).

Figure 9:
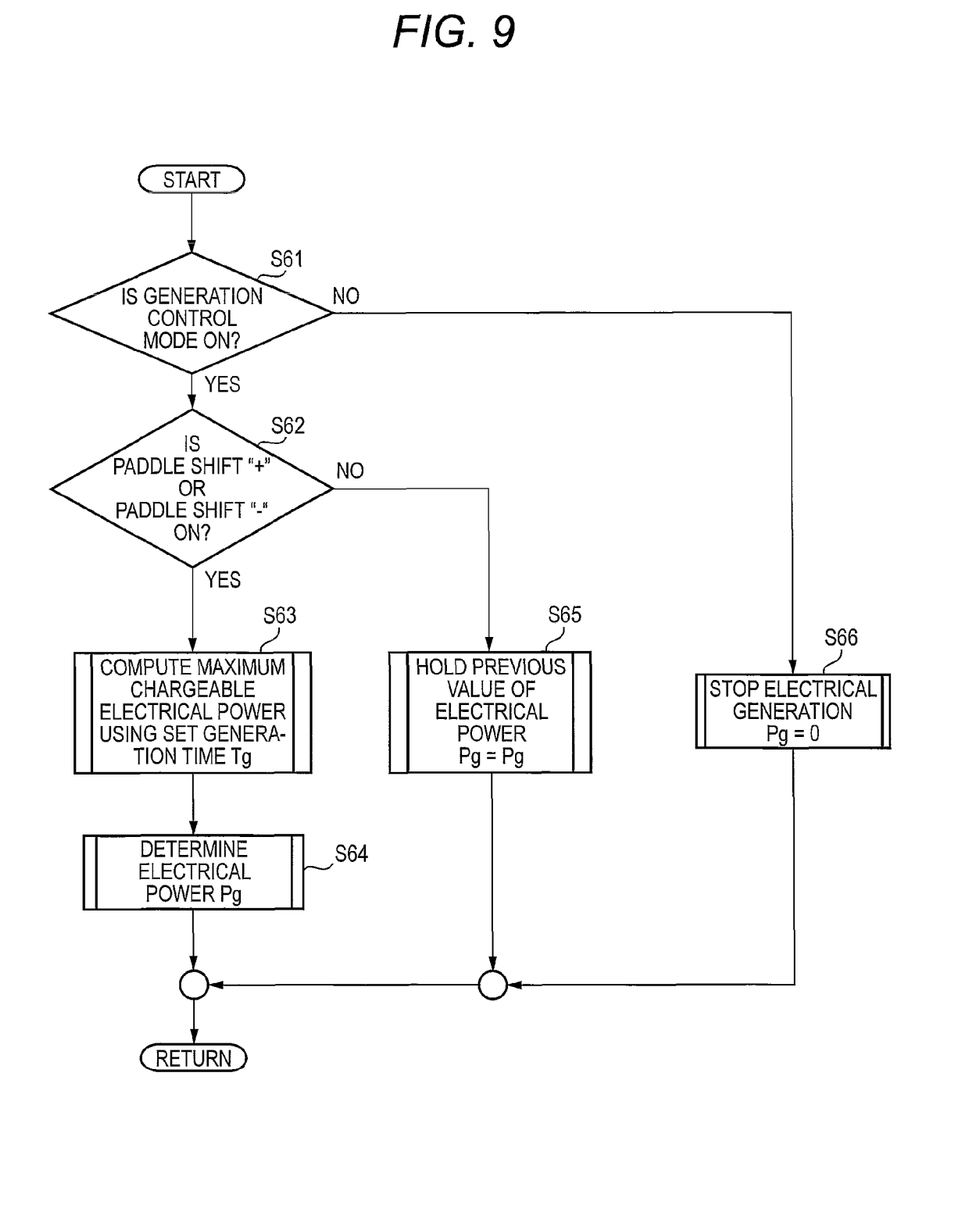
FIG. 9 is a flowchart illustrating setting of electrical power in a generation control mode under the control illustrated in FIG. 7.

Through the procedure illustrated in FIGS. 8 and 9, in the state where the generation control mode is "on", the use of the "+" lever and the "−" lever of the paddle shift 21 enables the driver to increase or decrease the generation time to set the generation time, and the maximum electrical power Pg that does not exceed the acceptable electrical power Pb is set according to the set generation time to perform the electrical generation. As a result, once the generation time is set, the driver is not required to conduct any operation unless there is a need to change the setting or stop the charging operation, and if the battery SOC value a4 becomes the predetermined value (Coff) or higher, or the elapsed time T after the generation control mode turns "on" exceeds the set generation time Tg, the generation control mode is automatically completed.

Also, the driver can set the generation time according to the surrounding environment. For example, in the silent environment such as residential area, if the generation time is set to be longer, the electrical power is decreased and the charging operation can be conducted in a state where the noise from the engine 11 is reduced. Also, the quick charging operation is required in the environment where no noise is taken into account, if the generation time is set to be shorter, the electrical power is increased and an output from the motor generator 12 is increased to enable the quick charging operation.

If the generation control mode is "on", a fuel-efficient operating point is calculated on the basis of the electrical power Pg set through the above procedure with reference to the mapping diagram illustrated in FIG. 5. The electrical generation is performed while the engine 11, the motor generator 12, and the inverter 13 are controlled under the condition of the calculated operational point. Thereafter, as illustrated in FIG. 7, the generation control mode is automatically canceled when the SOC reaches the predetermined value or the set generation time Tg is elapsed, and the charging operation is completed. The operational point thus calculated is the most fuel-efficient operating condition in the same electrical power. FIG. 5 is the mapping diagram in which the fuel-efficiency map of the engine 11 and an output curve of the electrical power in the electrical generator (motor generator 12) overlap with each other with respect to the number of revolutions and torque of the engine 11.

For example, in the mapping diagram illustrated in FIG. 5, if the electrical power "Pg" is "10 kW" (Pg=10), the highest fuel efficiency is about 20%, and the electrical generation is performed with the number of revolutions and the torque at the operating point of this condition, that is, the operating point on a heavy line. Also, if the electrical power "Pg" is "40 kW" (Pg=40 kW) the highest fuel efficiency is about 35%, and the electrical generation is performed with the number of revolutions and the torque at the operating point of this condition, that is, the operating point on the heavy line.

In the above-mentioned control, since the maximum electrical power Pg that is acceptable by the battery 14 is set in correspondence with the set generation time Tg, the maximum electrical power is charged within the generation time Tg. Accordingly, when travel in the EV mode is intended to be conducted as soon as possible, even under the environment where there is no quick charger, the engine 11 is used to perform the electrical generation so that the battery 14 can be charged with electric power of several tens kW, and the battery 14 can be charged up to a desired SOC in a short time, as compared with the charging from the home electrical power that charges the battery with electric power of several kW.

When there is a possibility that the SOC reaches a desired value earlier than the set generation time Tg after starting the charging operation, the electrical power is switched to the smaller electrical power where the electrical generation may be performed continuously for the set generation time Tg to continue the charging. In this case, since the electrical generation is performed with the lower number of revolutions of the engine, the electrical power is controlled taking the surrounding circumstance into consideration.

According to an aspect of the invention, when the shift position is a non-travel position, the brake is on, and the charging start unit (for example, the charging switch) operates, the battery starts to be charged by the engine and the electrical generator. After starting to charge the battery, setting for increasing the electrical power is conducted when the increasing/decreasing unit conducts increasing operation, or setting for decreasing the electrical power is conducted when the increasing/decreasing unit conducts decreasing operation. Therefore, desired electrical power can be set, and the battery can be charged up to a predetermined SOC. As a result, when the battery needs to be quickly charged up to the predetermined SOC, setting for increasing the electrical power is conducted so that the battery can be charged with larger electrical power. Also, when the battery needs to be charged under quiet environments, setting for decreasing the electrical power is conducted so that the battery can be charged with smaller electrical power, that is, while suppressing noise of the engine.

According to an aspect of the invention, charging the battery by the engine and the electrical generator stops when the decreasing operation of the increasing/decreasing unit continues for a predetermined period. Therefore, when the driver wants to stop the charging operation, the charging operation can be stopped.

According to an aspect of the invention, the number of revolutions and the torque of the engine, which are highest in the fuel efficiency, are determined according to the map on the basis of the set electrical power, and the engine is controlled to drive the electrical generator according to the determined number of revolutions and torque. Therefore, the charging operation can be efficiently conducted while suppressing useless fuel consumption.

According to an aspect of the invention, since the existing paddle shift is used as the increasing/decreasing unit, manufacturing costs can be suppressed, and desired electrical power can be set by simple operation.

According to an aspect of the invention, when the shift position is a non-travel position, the brake is on, and the charging start unit (for example, the charging switch) operates, the battery starts to be charged by the engine and the electrical generator. After starting to charge the battery, setting for increasing the generation time is conducted when the increasing/decreasing unit conducts increasing operation, or setting for decreasing the generation time is conducted when the increasing/decreasing unit conducts decreasing operation. Therefore, desired generation time can be set, and the battery can be charged up to a predetermined SOC within desired time. As a result, when the battery needs to be quickly charged up to the predetermined SOC, the generation time is set to be shorter, so that the battery can be charged with large electrical power. Also, when the battery needs to be charged under quiet environments, the generation time is set to be longer, and the battery can be charged with small electrical power, that is, while suppressing the noise of the engine.

According to an aspect of the invention, the chargeable capacity of the battery is divided by the set generation time to obtain the maximum chargeable capacity per unit time, and the electrical power used for the electrical generation is set after the maximum chargeable electrical power is compared with the battery acceptable electrical power. Therefore, the electrical generation is performed with the maximum electrical power that does not exceed the battery acceptable electrical power, the battery can be charged up to the predetermined SOC within the desired time, excessive electrical generation is prevented, useless fuel consumption is suppressed, and the charging operation can be effectively conducted.

The present invention is suitable for the hybrid vehicle.

What is claimed is:

1. A generation control device for a hybrid vehicle in which an electrical generator is driven by an engine, and a battery is charged by electrical generation performed by the electrical generator and the engine, the generation control device comprising:
   a shift position detection unit that detects a shift position;
   a brake detection unit that detects whether a brake is on or off;
   a charging start unit that forces the engine and the electrical generator to operate to charge the battery by a manual operation of the charging start unit;
   an increasing/decreasing unit that conducts an increasing operation or a decreasing operation according to manual user operations; and
   a control unit that starts to charge the battery when the shift position is a non-travel position, the brake is on, and the charging start unit is operated, and
   wherein, after starting to charge the battery, a parameter related to the electrical generation is incrementally increased by the control unit in response to successive increasing operations of the increasing/decreasing unit, or
   wherein, after starting to charge the battery, a parameter related to the electrical generation is incrementally decreased by the control unit in response to successive decreasing operations of the increasing/decreasing unit, and
   wherein, the control unit controls the engine and the electrical generator so as to perform the electrical generation based on the set parameter.

2. The generation control device according to claim 1, wherein
   the parameter related to the electrical generation is electrical power, and
   the control unit sets the electrical power and controls the engine and the electrical generator so as to perform the electrical generation with the set electrical power.

3. The generation control device according to claim 2, wherein
   the control unit stops charging the battery when the decreasing operation is continuously conducted for a predetermined period.

4. The generation control device according to claim 2, wherein
   the control unit has a map in which an efficiency map of a fuel efficiency with respect to a number of revolutions and a torque of the engine and an output curve of electrical power with respect to the number of revolutions and the torque of the engine overlap with each other, and
   the control unit determines the number of revolutions and the torque of the engine, which are highest in the fuel efficiency, according to the map on the basis of the set electrical power, and controls the engine according to the determined number of revolutions and torque to drive the electrical generator.

5. The generation control device according to claim 2, wherein the increasing/decreasing unit includes a paddle shift that conducts a shift-up operation and a shift-down operation when the shift position is in a travel position, and increases or decreases the parameter when the shift position is in the non-travel position.

6. The generation control device according to claim 1, wherein
the parameter related to the electrical generation is generation time, and
the control unit sets the generation time and controls the engine and the electrical generator so as to perform the electrical generation in the set generation time.

7. The generation control device according to claim 6, wherein
the control unit stops charging the battery when the decreasing operation is continuously conducted for a predetermined period.

8. The generation control device according to claim 6, wherein
the control unit divides a chargeable capacity of the battery by the generation time to obtain maximum chargeable electrical power per unit time, and compares the maximum chargeable electrical power with an acceptable electrical power of the battery,
when the maximum chargeable electrical power is equal to or smaller than the acceptable electrical power, the control unit sets the maximum chargeable electrical power as electrical power for the electrical generation,
when the maximum chargeable electrical power exceeds the acceptable electrical power, the control unit sets the acceptable electrical power as electrical power for the electrical generation, and
the control unit controls the engine and the electrical generator so as to perform the electrical generation with the set electrical power.

9. The generation control device according to claim 8, wherein
the control unit has a map in which an efficiency map of a fuel efficiency with respect to a number of revolutions and a torque of the engine and an output curve of electrical power with respect to the number of revolutions and the torque of the engine overlap with each other, and
the control unit determines the number of revolutions and the torque of the engine, which are highest in the fuel efficiency, according to the map on the basis of the set electrical power, and controls the engine according to the determined number of revolutions and torque to drive the electrical generator.

10. The generation control device according to claim 6, wherein the increasing/decreasing unit includes a paddle shift that conducts a shift-up operation and a shift-down operation when the shift position is in a travel position, and increases or decreases the parameter when the shift position is in the non-travel position.

11. The generation control device according to claim 1, wherein
the increasing/decreasing unit is integrally formed with the charging start unit, such that the engine and the electrical generator are forced to operate by a manual operation of the increasing/decreasing unit.

12. The generation control device according to claim 1, wherein
the control unit starts to charge the battery only when the shift position is the non-travel position, the brake is on, and the charging start unit is operated.

* * * * *